(12) United States Patent
Ogata

(10) Patent No.: US 6,394,906 B1
(45) Date of Patent: May 28, 2002

(54) ACTUATING DEVICE FOR GAME MACHINE

(75) Inventor: Hiroki Ogata, Chiba (JP)

(73) Assignee: Sony Computer Entertainment Inc. (JP)

( * ) Notice: Subject to any disclaimer, the term of this patent is extended or adjusted under 35 U.S.C. 154(b) by 0 days.

(21) Appl. No.: 09/158,062

(22) Filed: Sep. 22, 1998

(30) Foreign Application Priority Data

Sep. 22, 1997 (JP) .............................................. 9-257216

(51) Int. Cl.[7] .............................................. A63F 13/06
(52) U.S. Cl. ........................... 463/38; 463/37; 273/148 B
(58) Field of Search ................... 463/37, 38; 273/148 B

(56) References Cited

U.S. PATENT DOCUMENTS

| | | | | |
|---|---|---|---|---|
| 4,486,629 A | * | 12/1984 | Sledesky | 200/6 A |
| 4,739,315 A | * | 4/1988 | Soma et al. | 340/710 |
| 5,012,230 A | * | 4/1991 | Yasuda | 340/706 |
| 5,555,004 A | * | 9/1996 | Ono et al. | 345/161 |
| 5,701,142 A | * | 12/1997 | Brown et al. | 345/168 |
| 5,801,918 A | * | 9/1998 | Ahearn et al. | 361/683 |
| 5,897,437 A | * | 4/1999 | Nishiumi et al. | 463/47 |

FOREIGN PATENT DOCUMENTS

| | | |
|---|---|---|
| JP | 07-112074 | 5/1995 |
| JP | 62-194389 | 12/2001 |

OTHER PUBLICATIONS

PS Analog Controller Finally Launched on the Market!, Game Walker, Jun. 1997, p. 76, No. 32, Japan.

* cited by examiner

*Primary Examiner*—Joe H. Cheng
*Assistant Examiner*—Julie K Kasick
(74) *Attorney, Agent, or Firm*—Lerner, David, Littenberg, Krumholz & Mentlik, LLP

(57) ABSTRACT

An actuating device for a game machine is disclosed in which the hand or fingers do not fatigue on prolonged use, thereby imparting an optimum feel for the user. The actuating device has a main body unit and first and second grips projecting from one side of the main body unit at opposite ends thereof. Vibration-imparting units are enclosed within the first and second grips. First and second actuating units are mounted at opposite ends of the main body unit. The first and second actuating units include plural thrusting actuators which protrude from the upper surface of the main body unit. Third and fourth actuating units are arranged on the proximal ends of the first and second grips so as to confront one another. The third and fourth actuating units include rotation actuators and signal input elements actuated by the rotation actuators. The portions of the rotation actuators which actuate the third and fourth actuating units are provided with top portions of a flexible material having outwardly bulging distal end portions.

15 Claims, 15 Drawing Sheets

ACTUATING DEVICE FOR GAME MACHINE

BACKGROUND OF THE INVENTION

1. Field of the invention

This invention relates to an actuating device used in a game machine employing a display unit of, for example, a television receiver. More particularly, it relates to an actuating device for a game machine having an actuating portion for controlling various operations, such as those of rotating a display character on a display screen, continuously changing the movement speed or deforming the display character.

2. Description of the Related Art

Conventionally, a game machine employing a television receiver has a main body unit of the game machine, connected to a television receiver used as a display device, and an actuating device for controlling a display character connected via a connection cable to the main body unit of the game machine and which is displayed on the display screen of the television receiver.

The main body unit of the game machine has, enclosed therein, a disc driving portion for reproducing an optical disc as a recording medium carrying a game program and a picture processing device for displaying on the screen of the television receiver a display character along with the background picture in accordance with a game program recorded on the optical disc.

On the actuating device, connected to the main body unit of the game machine, there are arranged plural actuators. The user actuates these actuators to input the command information concerning the operation of the display characters displayed on the display screen of the television receiver to control the movement direction of the display character depending on the command information.

The actuating device used in this type of the game machine is held by hand or finger during use. On one side and on the opposite side of the main body unit, there are arranged a direction command actuating unit having a cross-shaped or circular direction indicating operating button and a function setting executing unit having plural function setting executing buttons for setting the operating function of the display character or executing its operation. The direction command actuating unit includes four switches having actuators which are arranged orthogonally relative to one another and which are brought into and out of contact with the contact. These switches are selectively turned on and off by the cross-shaped or circular direction command actuators for moving the display character. For example, the display character is digitally moved in the direction along which is arrayed the one of the four switches that is turned on. The function setting executing unit includes switches in association with the plural function setting actuators so that the function of the display character allocated to each button is set or the function proper to the display character is executed.

The direction command actuator of the actuating device is configured so that the one of the four switches arranged in the mutually perpendicular directions gives a command signal of moving the display character in the direction along which is arrayed the switch turned on, so that it is not possible to give the command information of rotating and simultaneously advancing the display character or changing its line of sight. The result is that it becomes difficult to construct the game program employing the display character performing diversified operations.

On the other hand, since switches constituting the direction command actuating unit simply is turned on and off by actuation of the direction command actuator to give the command information controlling the movement of the display character, the movement of the display character becomes intermittent such that a series of continuous movements cannot be executed.

There has been proposed an actuating device having an actuating unit which renders it possible to input a command signal for moving and simultaneously rotating the display character, moving the display character as its speed is varied or changing its configurations.

This type of the actuating device is described in the Japanese Laying-open Publication H-7-88252.

There is provided in an actuator adapted to be thrust and simultaneously rotated in the actuating unit adapted for rotating a display character or changing its configuration. This type of the actuator is gripped or thrust by hand or finger.

The actuator for actuating the direction command actuator is also thrust by being thrust by hand or finger.

The actuator of the actuating device for the game machine is frequently acted on during execution of the game program. Moreover, the actuating unit is used for prolonged time.

SUMMARY OF THE INVENTION

It is therefore an object of the present invention to provide an actuating unit for the game machine which can give an optimum operating feeling to the actuation of the actuator acted on frequently.

It is another object of the present invention to provide an actuating unit for the game machine in which the user is not fatigued in hand, finger or even on prolonged use of the unit.

It is still another object of the present invention to provide an actuating device for a game machine which affords an agreeable use feeling and which is high in reliability.

It is yet another object of the present invention to provide an actuating device for a game machine which enables the game to be executed with highly vivid play feeling.

For accomplishing the above objects, an actuating device for a game machine includes first and second grips protruded from one side of each end of the main body unit of the device. On one and the opposite ends of the main body unit are provided first and second actuating units. Each of the first and second actuating units is provided with plural thrusting actuators projected to the upper surface side of the main body unit and with plural signal input elements thrust by these thrusting actuators.

The actuating device also includes third and fourth actuating units arranged facing each other on the proximal ends of the first and second grips and which are provided with signal input terminals actuated by the thrusting actuators. These third and fourth actuating units can be actuated by thumb fingers of both hands of the user holding the first and second grips.

The third and fourth actuating units including the signal input terminals actuated by the rotation actuators input to the main body unit of the device command signals enable rotation and translation simultaneously of the display character displayed on the screen, movement of the display character with varying speed or change of the configuration.

In the present actuating device for the game machine, each rotation actuator includes a main actuator body portion of a synthetic resin connected to an associated actuating unit and a top portion of a flexible material swollen-out at its distal end and which is formed as one with the main actuator body portion. Since the top portion contacted with the hand or finger has its distal end swollen-out and is formed of a flexible material, an optimum contact feeling can be realized to improve use feeling.

There is enclosed in the actuating device of the present invention a vibration-imparting unit which imparts vibrations to the user during operation to execute a game with a vivid play feeling. This vibration-imparting unit is provided in the first and second grips and is made up of a driving motor and an eccentric member mounted on a driving shaft of the motor. The vibration-imparting unit has different vibration-imparting states to realize a more vivid play feeling in executing a game.

In the actuating device for the game machine according to the present invention, since the top portion of the rotation actuator for entering a command signal in executing the game program, contacted by the hand or finger of the user, is formed of a flexible material and is swollen out at its distal end, optimum contact feeling may be realized to improve the use feeling.

Since the main actuator body portion and the top portion making up the rotation actuator is formed by two-color molding, the main actuator body portion and the top portion can be positively unified to each other to assure high operational reliability of the actuating unit.

DESCRIPTION OF THE PREFERRED EMBODIMENTS

Figure 1:
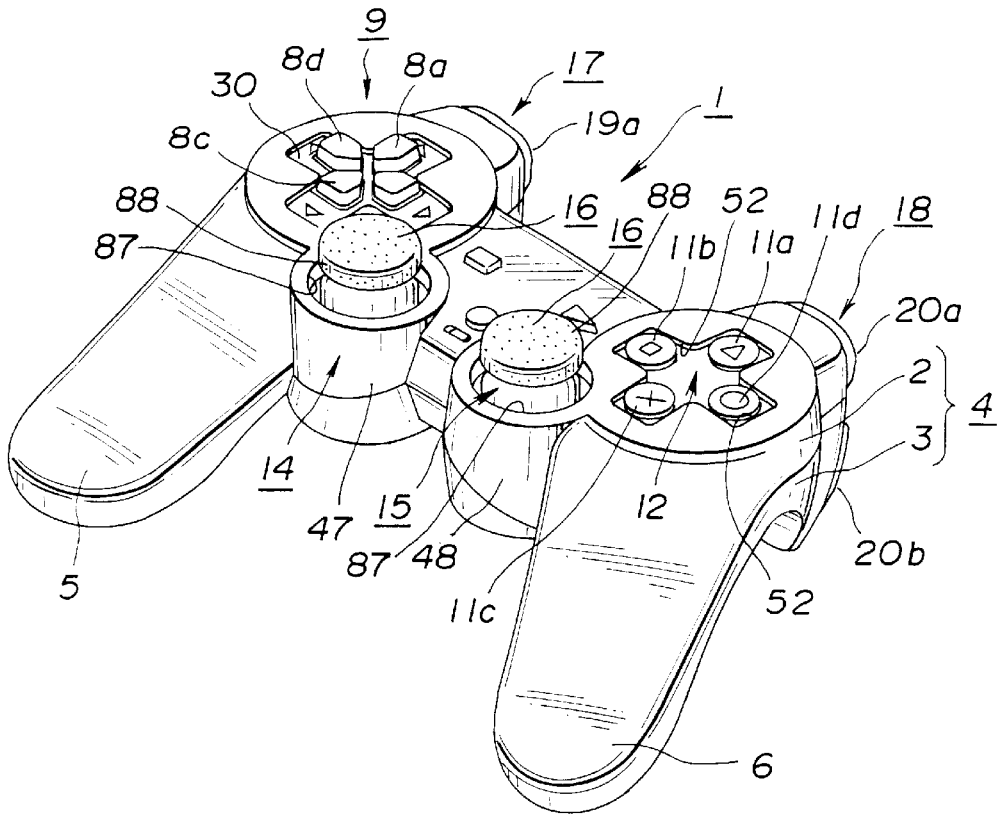
FIG. 1 is a perspective view showing an actuating device for a game machine.

Referring to the drawings, an actuating device for a game machine according to the present invention will be explained in detail.

The actuating device for the game machine is connected to a main body unit of the game machine having enclosed therein a disc driving unit for reproducing an optical disc as a recording medium carrying a recorded game program and a picture processing device for displaying a display character along with the background on a screen of the television receiver in accordance with a game program recorded on the optical disc.

Figure 2:
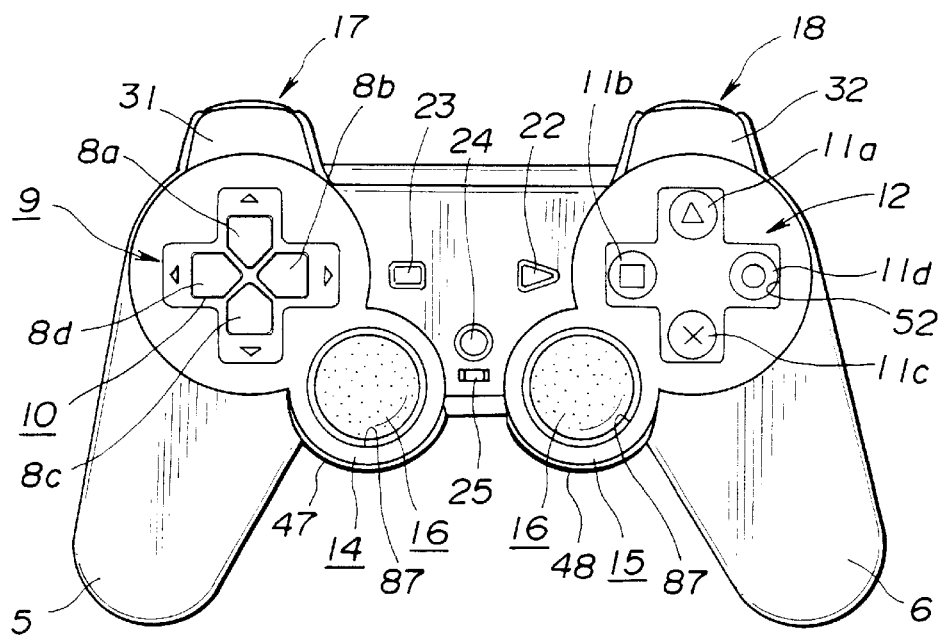
FIG. 2 is a plan view showing the actuating device shown in FIG. 1.
Figure 3:
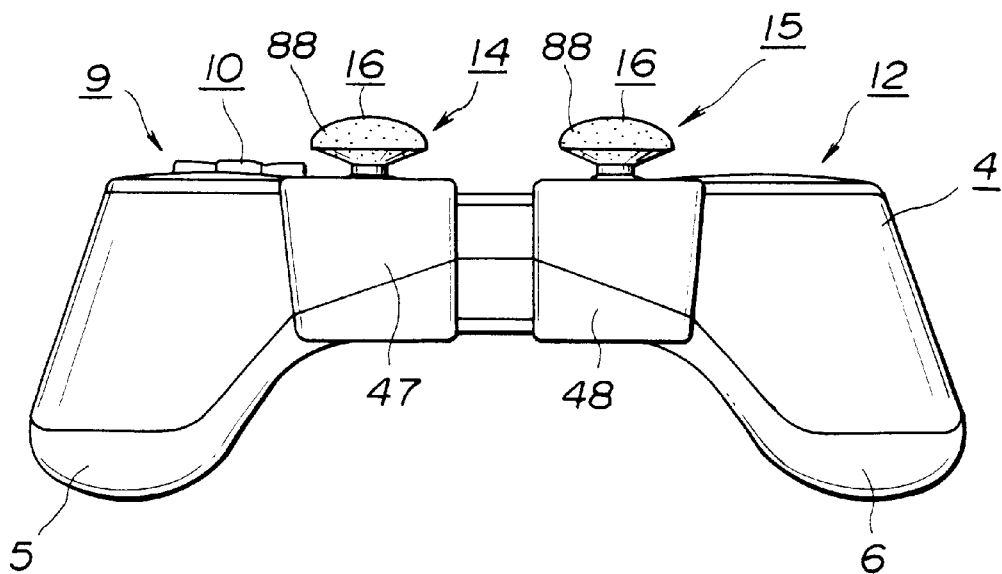
FIG. 3 is a back-side view thereof.
Figure 4:
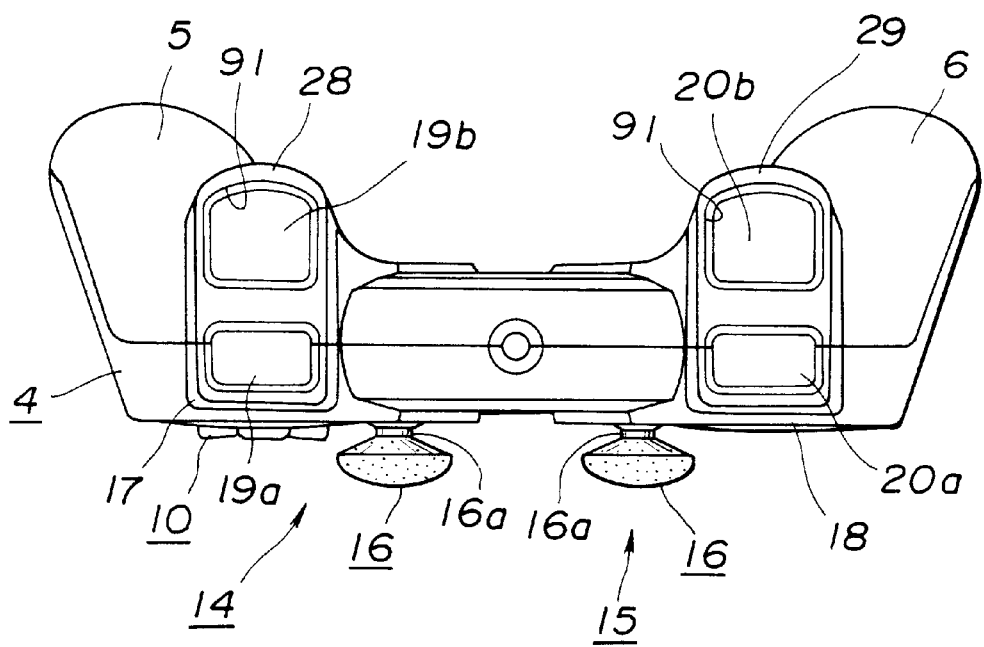
FIG. 4 is front view thereof.
Figure 5:
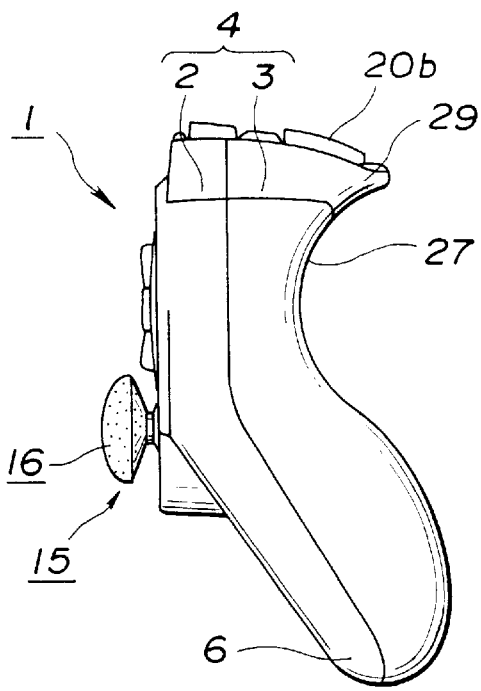
FIG. 5 is a right-hand side view thereof
Figure 6:
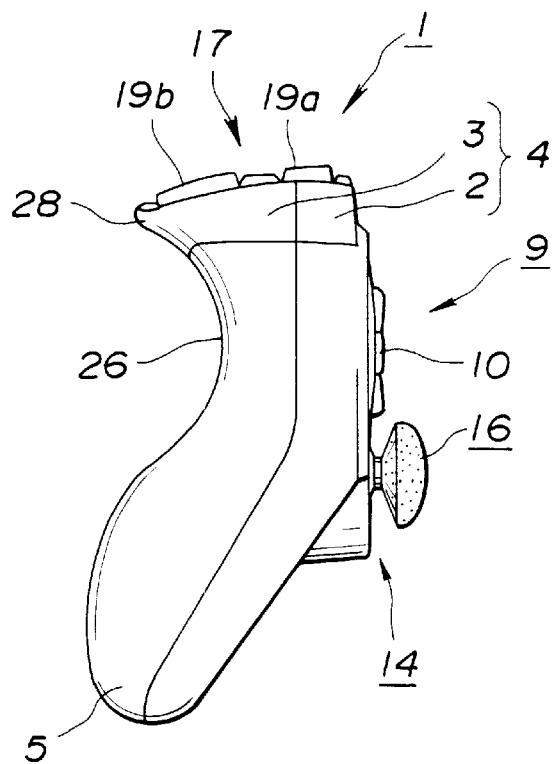
FIG. 6 is a left-hand side view thereof.

An actuating device 1 for the game machine according to the present invention includes a main body unit 4 made up of an upper half 2 and a lower half 3 abutted and connected to each other by fasteners, such as set screws, as shown in FIG. 1. From one side of ends of the main body unit 4 are protruded a first grip 5 and a second grip 6 which are held by left and right palms when the device 1 is connected to the main body unit of the game a machine for executing the game. The first and second grips 5, 6 are protruded towards the lower side of the main body unit 4 as they are flared and spaced apart from each other towards their distal ends, as shown in FIGS. 2 to 4. For enabling prolonged gripping of the first and second grips 5, 6, these grips are tapered from the connecting sides to the main body unit 4 towards the distal ends, while being arcuately contoured in peripheral surfaces and at the distal ends, as shown in FIGS. 2, 5 and 6.

On one end of the main body unit 4 is provided a first actuating unit 9, having first to fourth thrusting actuators 8a, 8b, 8c, 8d protruded on the upper surface side of the main body unit 4, as shown in FIGS. 1 and 2. The first to fourth thrusting actuators 8a to 8d making up the first actuating unit 9 are formed as one with a rotary actuating member 10 having its center portion supported for rotation and are arrayed in mutually perpendicular directions about the center of rotation of the rotary actuating member 10. That is, the first actuating unit 9 is provided with switch elements as signal inputting elements in association with the first to fourth thrusting actuators 8a to 8d. The first actuating unit 9, operates as a direction command controller for controlling the movement of the display character. By selectively thrusting the first to fourth thrusting actuators 8a to 8d to turn the switches associated with these thrusting actuators 8a to 8d on and off, the display character is moved in the arraying direction of the thrustingly actuated thrusting actuators 8a to 8d.

On the opposite side of the main body unit 4 is arranged a second actuating unit 12 having first to fourth thrusting actuators 11a, 11b, 11c, 11d protruded from the main body unit 4 and which are arranged in mutually perpendicular directions, as shown in FIGS. 1 and 2. These first to fourth thrusting actuators 11a to 11d are formed as independent members and signal inputting elements, not shown, are provided in association with the thrusting actuators 11a to 11d. The second actuating unit 12 operates as a fimction setting executing unit for setting the functions of the display character allocated to the thrusting actuators 11a to 11d or executing the functions owned by the display character by turning the switches associated with the first to fourth thrusting actuators 11a to 11d on and off.

The actuating device 1 according to the present invention includes third and fourth actuators 14, 15 mounted facing each other on the corners of the proximal ends of the first and second grips 5, 6 connecting to the main body unit 4, as shown in FIGS. 1 and 2. These third and fourth actuators 14, 15 are provided with a rotation actuator 16 rotatable through 360° about a central actuating shaft and a signal inputting element, such as a variable resistance element, actuated by this rotation actuator 16. Specifically, the rotation actuator 16 is mounted at the distal end of an actuating shaft, mounted under the bias of a biasing member for restoration thereof to a neutral position, and is rotated through 360° about the center of the actuating shaft as the center of rotation. These third and fourth actuators 14, 15 use an actuating unit which, by rotating the rotation actuator 16 issues a command signal for realizing analog movements, such as rotating and simultaneously moving the display character, moving the display character with a variable speed, or varying its configurations.

On left and right side ends on the front side of the main body unit 4 opposite to its back side provided with the first and second grips 5, 6 are arranged fifth and sixth actuating units 17, 18. These fifth and sixth actuating units 17, 18 are provided with first and second thrusting actuators 19a, 19b and 20a, 20b, respectively, as shown in FIG. 4. These thrusting actuators 19a, 19b and 20a, 20b are provided with associated switching elements. The fifth and sixth actuating units 17, 18 operate as function setting executing units for setting the functions of the display character allocated to the thrusting actuators 19a, 19b and 20a, 20b or executing the functions owned by the display character by turning on switches, not shown, associated with the first and second thrusting actuators 19a, 19b and 20a, 20b.

Between the first actuating unit 9 and the second actuating unit 12 on the upper surface of the main body unit 4, there are provided, side-by-side, a start switch 22 for commanding the start of a game and a selection switch 23 for selecting relative facility or difficulty when starting a game, as shown in FIGS. 1 and 2. On the other hand, there are provided, between the third actuating unit 14 and the fourth actuating unit 15 on the upper surface of the main body unit 4, a mode selection switch 24 for selecting the operating mode of the third and fourth actuating units 14, 15 and a display unit 25 for displaying the state of the operating modes of the third and fourth actuating units 14, 15. The display unit 25 is constituted by a light emitting element, such as LED. By the changeover operation of the mode selection switch 24, an operating mode enabling the inputting of a command signal from the third and fourth actuating units 14, 15 or an operating mode inhibiting the inputting of the command signal from the third and fourth actuating units 14, 15 is selected, while the command signal from the third and fourth actuating units 14, 15 is enabled to be entered and the operating mode is selected which has made a switching between the function of the first to fourth thrusting actuators 11a to 11d of the second actuating unit 12 and the function of the first and second thrusting actuators 19a, 19b and 20a, 20b of the fifth and sixth actuating units 17, 18. The display unit 25 is turned on and off depending on the state of these operating modes, while switching is made of the display light.

On the lower side of the main body unit 4 are formed engagement recesses 26, 27 in which portions of hands or fingers Rf, Lf are engaged when the first grip 5 and the second grip 6 are gripped by the hands or fingers Rf, Lf, as shown in FIGS. 5 to 8. These engagement recesses 26, 27 are formed as smoothly curved reentrant recesses, as shown in FIGS. 5 and 6.

On the front side of the main body unit 4 are formed depending finger supports 28, 29, in association with the engagement recesses 26, 27, as shown in FIGS. 5 and 6. Specifically, these finger supports 28,29 are protuberantly formed from the lower ends of protrusions 31, 32 on both ends on the front surface of the main body unit 4 where the fifth and sixth actuating units 17, 18 are formed.

Figure 7:
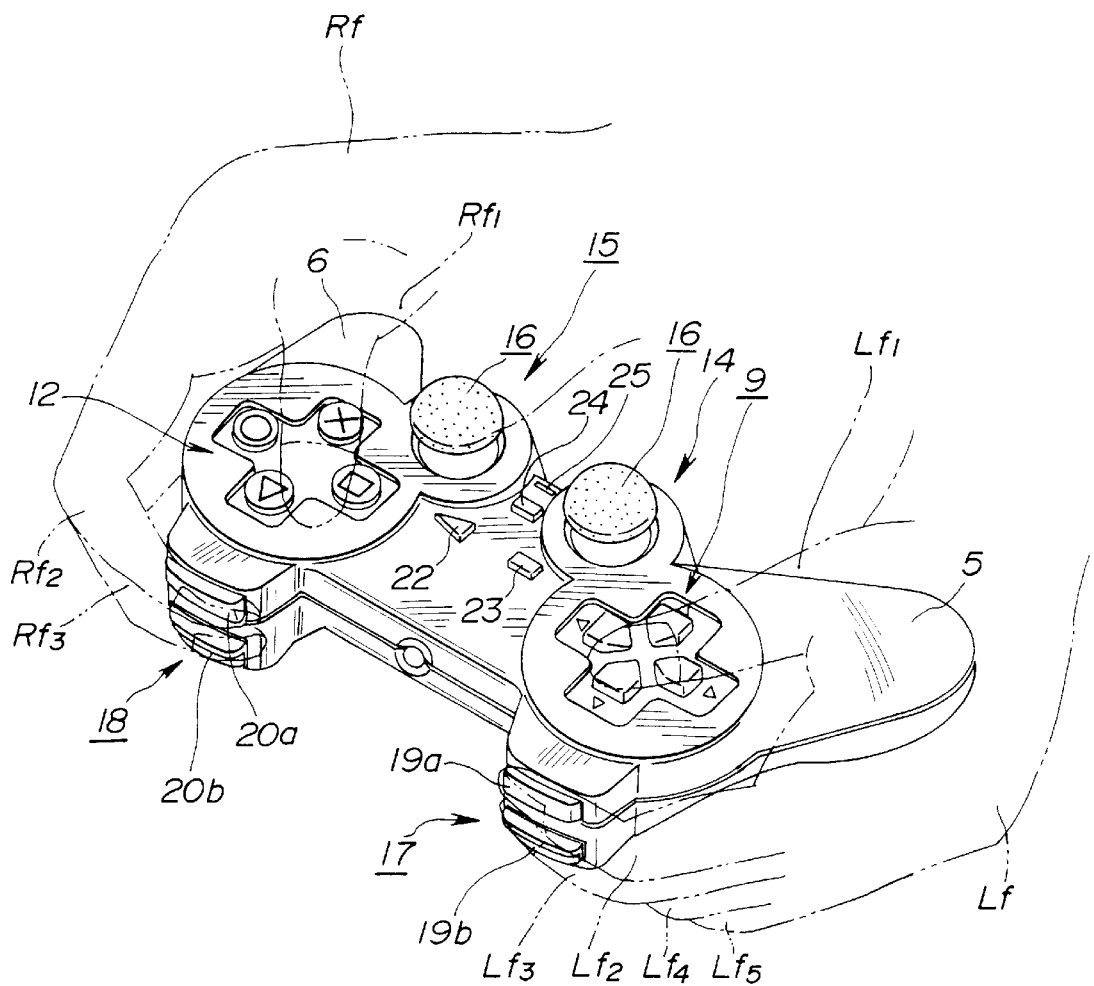
FIG. 7 is a perspective view showing the use state thereof

In the actuating device of the present invention, in which the first and second grips 5, 6 are protuberantly provided on the main body unit 4, as described above, these first and second grips 5, 6 are held in a wrapping fashion by both palms of the hands, as shown in FIG. 7, so that there is no necessity of holding the main body unit 4 by fingers, such that the actuating device 1 can be held in a state in which up to a maximum of ten and at least six fingers can be moved freely. If, for example, the first and second grips 5, 6 are held in a wrapping fashion by both palms of the hands, as shown in FIG. 7, thumb fingers Rf1, Lf1 of both hands can be extended over the rotation actuators 16 of the third and fourth actuating units 14, 15, over the first to fourth thrusting actuators 8a to 8d of the first actuating unit 9 and over the first to fourth thrusting actuators 11a to 11d of the second actuating unit 12 to permit selective thrusting of the rotation actuators 16 and the thrusting actuators 8a to 8d and 11a to 11d. In particular, since the rotation actuators 16 of the third and fourth actuating units 14, 15 are arranged facing each other on the proximal ends of the first and second grips 5, 6 corresponding to the connecting portions to the main body unit 4, the rotation actuators 16 are closest to the thumb fingers Rf1, Lf1 of both hands when the first and second grips 5, 6 are gripped by the hands, so that the rotation actuators 16 can be easily rotated by both thumb fingers Rf1, Lf1.

Also, when the first and second grips 5, 6 are gripped in a wrapping fashion by both palms of the hands, as shown in FIG. 7, index fingers Rf2, Lf2 and middle fingers Rf3, Lf3 of both hands can be extended to such positions as to enable selective thrusting of the first and second thrusting actuators 19a, 19b, 20a, 20b of the fifth and sixth actuating units 17, 18.

When the actuating device 1 is gripped by hands or fingers, finger supports 28, 29 can be held as the first and second grips 5, 6 are wrapped in the palms of the hands, while fourth fingers Rf4, Lf4 of both hands and/or little fingers Rf5, Lf5 are engaged in the engagement recesses 26, 27, so that the main body unit 4 can be held at fixed positions relative to the fingers of the hands of the user. That is, the fingers can be correctly positioned in association with the first to sixth actuating units 9, 12, 14, 15, 17 and 18, thus realizing reliable actuation.

Figure 8:
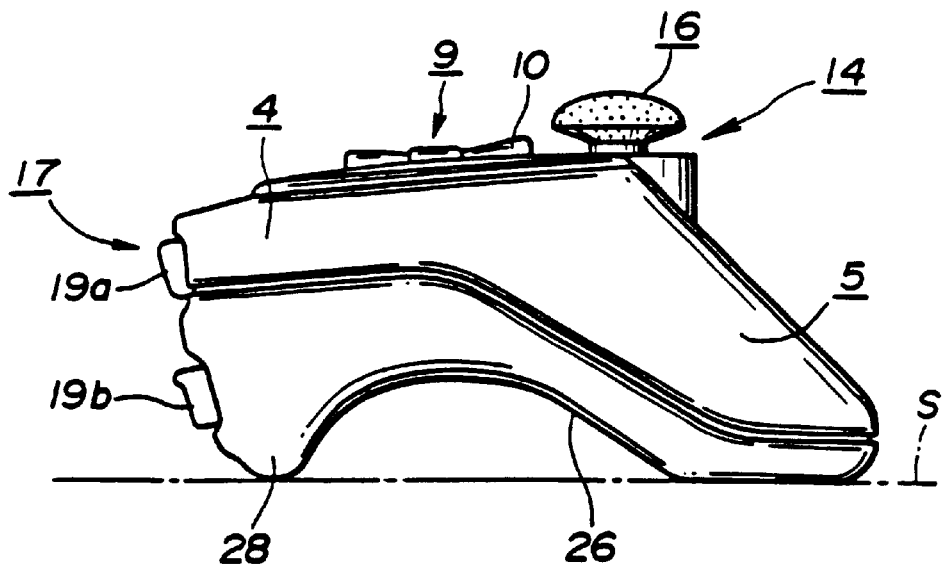
FIG. 8 is a side view showing the state of using the actuating device for the game a machine mounted in a mounting surface.

The actuating device 1 according to the present invention can also be set on a planar setting surface S, such as a table, as shown in FIG. 8. If the actuating device 1 is set on the setting surface S, with the distal ends of the first and second grips 5, 6 and those of the finger supports 28, 29 as supports, the actuating surfaces of the first to fourth thrusting actuators 8a to 8d of the first actuating unit 9, the first to fourth thrusting actuators 11a to 11d of the second actuating unit 12 and the rotation actuators 16 of the third and fourth actuating units 14, 15 are substantially parallel to the setting surface S, as shown in FIG. 8. Thus, the actuating device 1 of the present invention can be set on the planar setting surface S and the hands placed on the setting surface S, with the first and second grips 5, 6 being supported by the palms to actuate the first to sixth actuating units 9, 12, 14, 15, 17 and 18.

Figure 9:
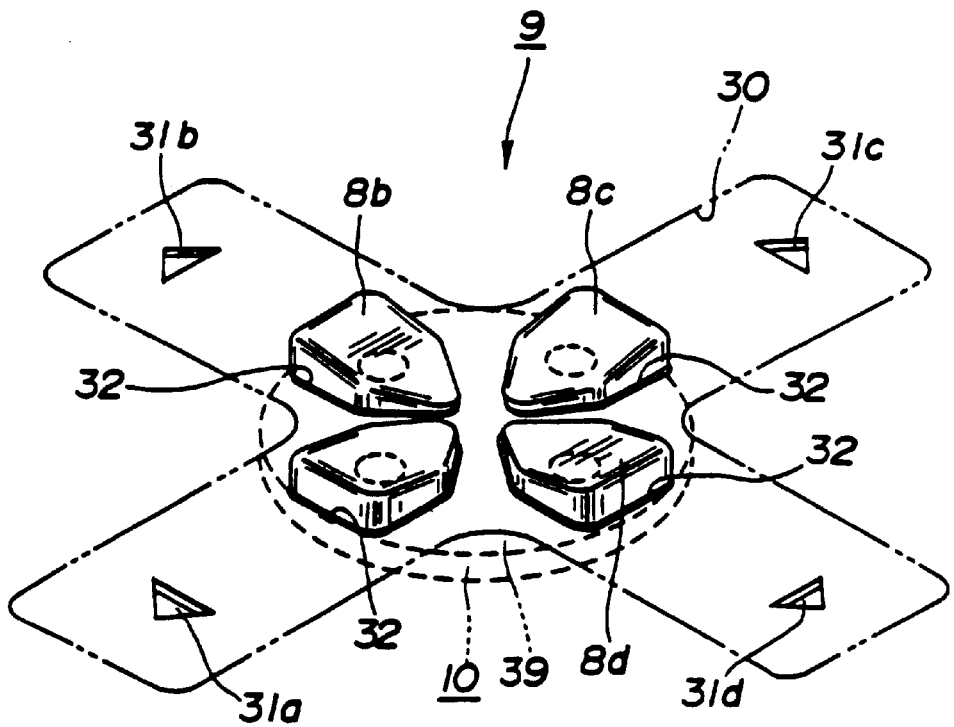
FIG. 9 is a perspective view showing essential portions of a first actuating unit.
Figure 10:
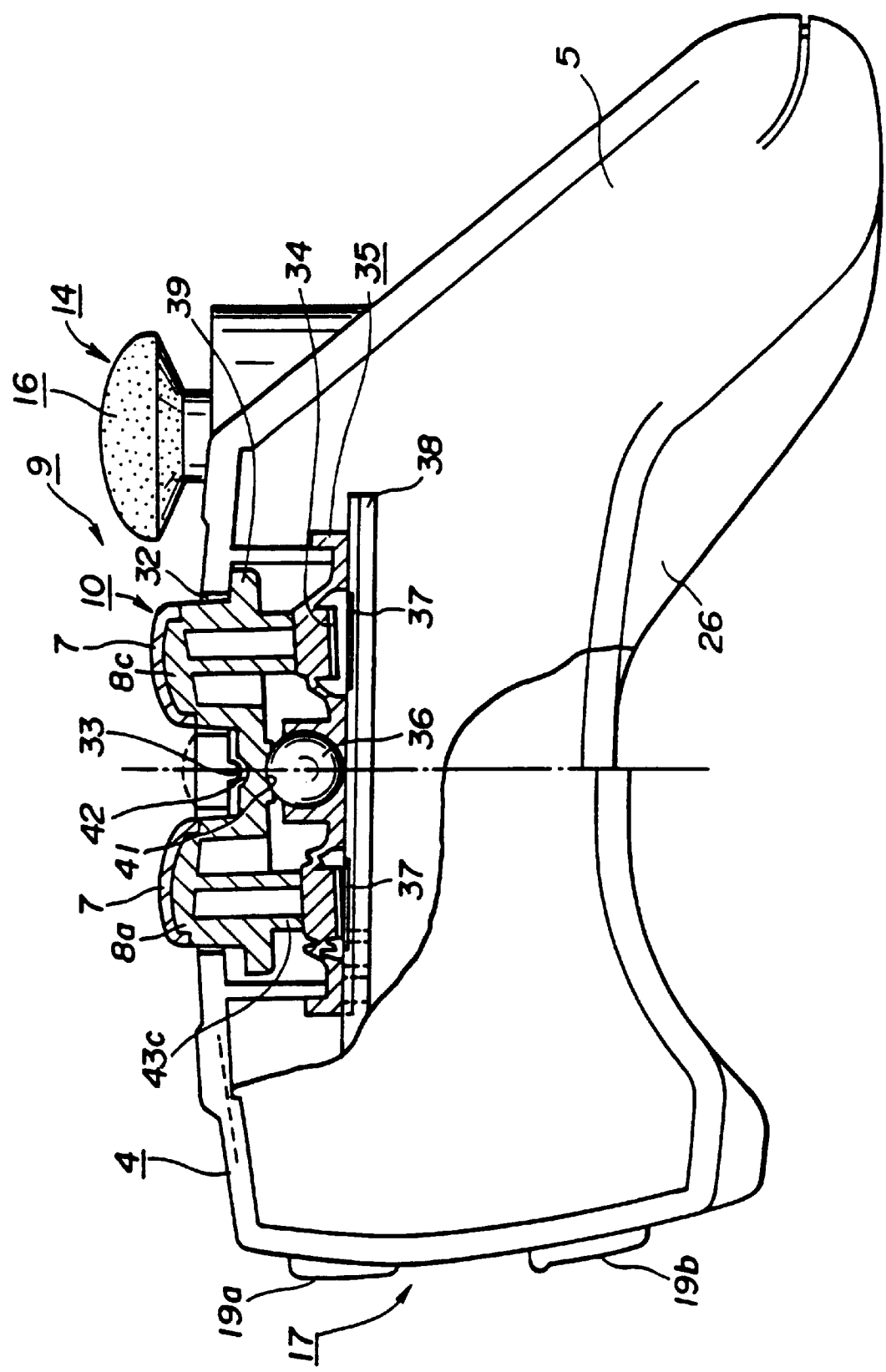
FIG. 10 is a partial cross-sectional view showing the first actuating unit.

The first actuating unit 9 of the actuating device 1 according to the present invention is explained in further detail. Referring to FIGS. 1, 9 and 10, the first to fourth thrusting actuators 8a to 8d are protuberantly formed on the rotary actuating member 10 within the substantially cross-shaped recess 30 on one end of the upper surface of the main body unit 4. On the upper and lower and left and right ends of the cross-shaped recess 30 are provided direction indicators 31a, 31b, 31c, 31d towards the inner sides of which four apertures 32 are formed in mutually perpendicular directions for allowing the first to fourth thrusting actuators 8a to 8d to be protruded from the upper surface side of the main body unit 4, respectively. The center area surrounded by these apertures 32 is formed as a central supporting projection 33 for supporting the center portion on the upper surface side of the main body unit 4, as shown in FIG. 10. This central supporting projection 33 is formed as one with the upper inner surface of the main body unit 4. The central supporting projection 33 is faced by an elastic member 35 having four movable contacts 34 thrust by the first to fourth thrusting actuators 8a to 8d. At a center position of the elastic member 35 is held a spherically-shaped fulcrum member 36, such as a steel ball, adapted for supporting the center of the bottom surface side of the rotary actuating member 10. The elastic member 35 confronts a circuit substrate 38 including four stationary contacts 37 adapted to be contacted with and disengaged from the movable contacts 34.

The rotary actuating member 10 constituting the first actuating unit 9 is made up of a circular-shaped base 39, first to fourth thrusting actuators 8a to 8d formed as one with the upper part of the base 39, a spherically-shaped first recess 41 in the bottom surface of the center portion of the base 39, adapted for engaging in the spherical surface of a spherically-shaped fulcrum member 36, a spherically-shaped second recess 42 in the upper center surface portion of the base 39 adapted for engaging with the central supporting projection 33 and a contact guide 43 protuberantly formed on the lower side of the base 39 for thrusting the back surface of the movable contacts 34 of the elastic member 35, as shown in FIGS. 9 and 10. The four thrusting actuators 8a to 8d formed as one with the rotary actuating member 10, are formed on the upper side of the base 39 so that the thrusting actuators 8a to 8d are tapered in a direction towards an imaginary converging point and so that the thrusting actuators 8a to 8d are increased in thickness in a direction from the center towards the outer ends, as shown in FIG. 9. The thrusting actuators 8a to 8d are protrude via apertures 32 from the upper surface of the main body unit 4, as shown in FIG. 9.

The elastic member 35 is sandwiched between a circuit substrate 38 and the rotary actuating member 10 and is provided with a number of movable contacts 34, such as rubber contacts, corresponding to the number of the first to fourth thrusting actuators 8a to 8d.

A fulcrum member 36 is spherically-shaped and is arranged at a central portion of the rotary actuating member 10 in register with the central supporting projection 33. The fulcrum member 36 is engaged in a first recess 41 formed at the center of the rotary actuating member 10.

If the rotary actuating member 10 is arranged on the main body unit 4, the first to fourth thrusting actuators 8a to 8d are arranged radially, about the central supporting projection 33 as center, and are progressively increased in height from the imaginary converging side ends towards the opposite outer ends. The result is that, when the finger is set at the center portion of the recess 30 surrounded by the first to fourth thrusting actuators 8a to 8d, the relative position can be easily discriminated by the tactile feeling at the end of the finger, due to the step difference between the center portion and the first to fourth thrusting actuators 8a to 8d, such that, when the finger end is shifted for switch actuation from the center towards the outer side of the recess 30, which of the first to fourth thrusting actuators 8a to 8d is being thrust can be easily discriminated based solely on the tactile feeling.

The rotary actuating member 10, is formed as one with the first to fourth thrusting actuators 8a to 8d, are formed by molding a synthetic resin material of a relatively high toughness. The result is that the first to fourth thrusting actuators 8a to 8d of increased toughness are thrust by the hand or finger such that the operational feeling is not optimum.

Figure 11:
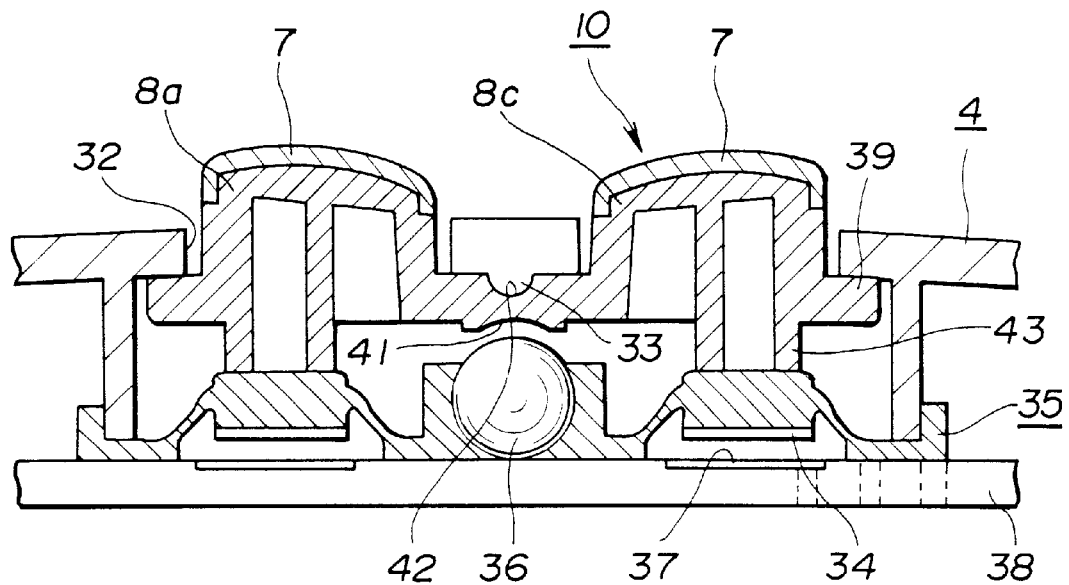
FIG. 11 is a cross-sectional showing the state of first to fourth thrusting actuators of the first actuating unit.

Thus, a top layer 7 formed of a soft flexible material is formed as one with the upper surfaces of the first to fourth thrusting actuators 8a to 8d acted on by the hand or finger, as shown in FIGS. 10 and 11. The top layer 7 is formed of a material exhibiting rubber-like elasticity. The top layer 7 is molded in two colors and formed as one with the first to fourth thrusting actuators 8a to 8d. The top layer 7 is slightly swollen out at the mid portion for improving the tactile feeling.

Since the top layer 7 of a soft flexible material is provided on the first to fourth thrusting actuators 8a to 8d, it is possible to relieve the impact otherwise applied to the hand or finger on thrusting actuation thus improving the operational feeling on actuation with the hand or finger. Since the elastomer of the top layer 7 has large friction, it acts to inhibit slipping of the hand or finger on thrusting actuation of the first to fourth thrusting actuators 8a to 8d.

If, in the above-described first actuating unit 9, none of the first to fourth thrusting actuators 8a to 8d is actuated, the rotary actuating member 10 is uplifted by the contact guide 43, under the bias of the elastic member 35, as shown in FIG. 11, with the central supporting projection 33 engaging in the spherically-shaped second recess 42 of the rotary actuating member 10. Simultaneously, the peripheral end of the circular-shaped base 39 is retained by the ends of aperture 32, the rotary actuating member 10 being then retained in an initial position, with the first to fourth thrusting actuators 8a to 8d being projected to outside or on the upper surface side of the main body unit 4.

Figure 12:
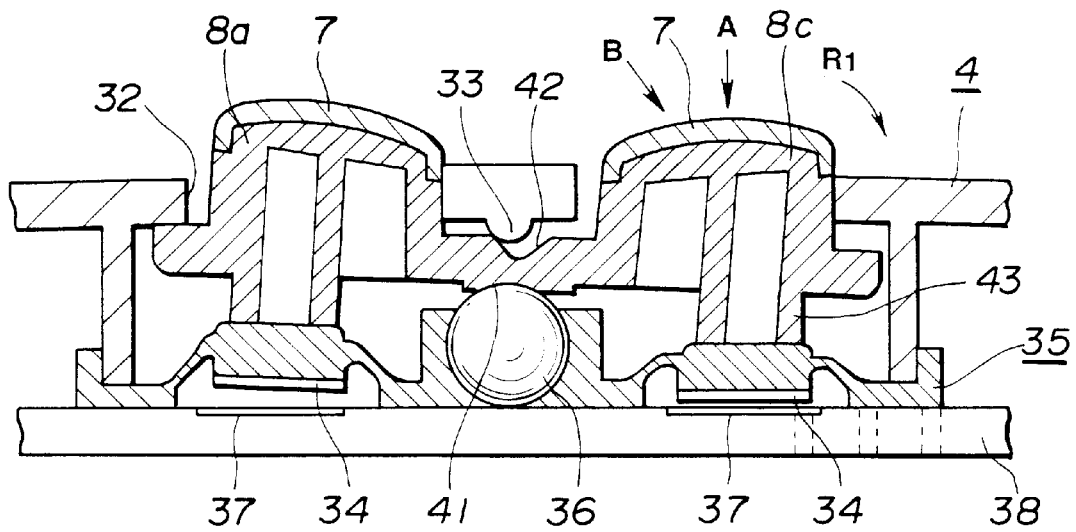
FIG. 12 is a cross-sectional view showing the state in which a second actuator of the first actuating unit is being thrust.
Figure 13:
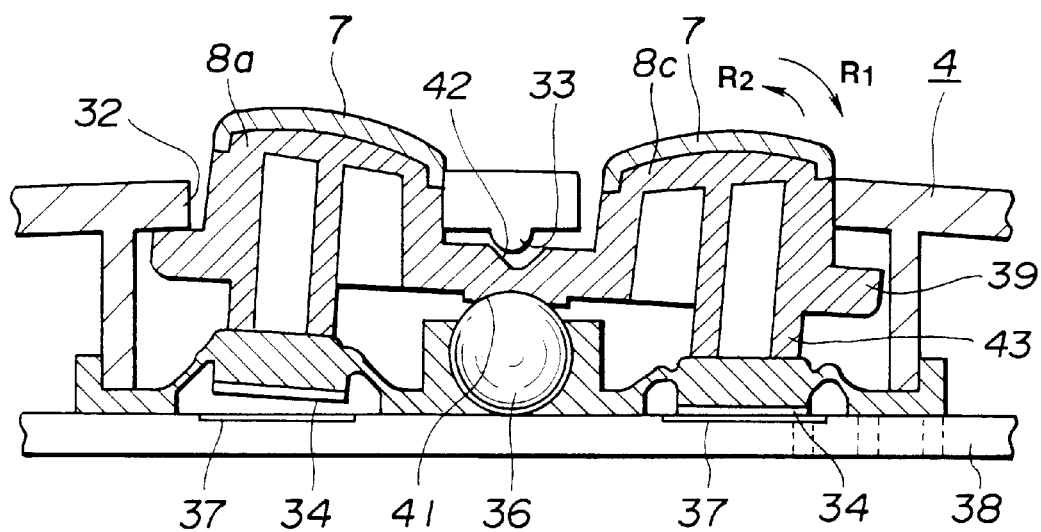
FIG. 13 is a cross-sectional view showing the state in which a second actuator of the first actuating unit has been thrust.

If, with the first to fourth thrusting actuators 8a to 8d in the initial position, the third thrusting actuator 8c is thrust in the direction indicated by arrow A or B in FIG. 12, the rotary actuating member 10 is rotated in the direction indicated by arrow R1 or towards right in FIG. 12. Thus, the third thrusting actuator 8c thrusts the elastic member 35 downwards. If the third thrusting actuator 8c is thrust further, the rotary actuating member 10 is rotated in the direction indicated by arrow R1 in FIG. 13, about the fulcrum member 36 as the center of rotation, until the movable contact 34 is contacted with the stationary contact 37 beneath it to establish the electrical connection.

If the thrusting on the third thrusting actuator 8c is relinquished, the first recess 41, kept in spherical surface contact with the fulcrum member 36, is moved away from the fulcrum member 36, under the bias of the elastic member 35. That is, the third thrusting actuator 8c is rotated in the direction indicated by arrow R2 in FIG. 13 to separate the movable contact 34 from the stationary contact 37. If the third thrusting actuator 8c is rotated further in the direction indicated by arrow R2 in FIG. 13 until the central supporting projection 33 is engaged in the second recess 42, the rotary actuating member 10 is reset to the initial position shown in FIG. 11.

On the other hand, if the first thrusting actuators 8a is thrust in the direction indicated by arrow C in FIG. 10 towards the front side of the main body unit 4, the elastic member 35 is deformed against the force of elasticity. Thus, the first thrusting actuator 8a is moved in the direction indicated by arrow C in FIG. 10, as the first recess 41 is rotated on the spherical surface of the fulcrum member 36, so that the movable contact 34 is contacted with the stationary contact 37 thereunder by way of switching.

The movable contacts 34 and the stationary contacts 37 make up switch elements, which are turned on and off by the contacts 34, 37 being in or out of contact with each other, in order to permit the inputting of a designating signal for moving the display character.

Since the operational fulcrum point for the first to fourth thrusting actuators 8a to 8d of the first actuating unit 9 is constituted by relative engagement between the spherically-shaped fulcrum member 36 and the spherically-shaped first recess 41, relative contact between the spherical surfaces can be exploited to change the stroke of the rotary actuating member 10 to perform the switching operation. In addition, since the thrusting actuators 8a to 8d are discretely provided on the main body unit 4, there is no limitation to the thrusting direction of the first to fourth thrusting actuators 8a to 8d, so that a smooth omnidirectional switching operation can be realized, thus improving operability by prevention of sporadic movements, deviation of the center position or distortion of the rotary actuating member 10.

The second actuating unit 12 of the actuating device 1 of the present invention is explained in further detail. The second actuating unit 12 has a substantially cross-shaped recess 51 towards the opposite side end on the upper surface of the main body unit 4, and apertures 52 in upper and lower and left and right ends of the recess 51, as shown in FIGS. 1 and 2. The second actuating unit 12 is constituted by first to fourth thrusting actuators 11a to 11d arranged on the main body unit 4 so that distal ends of the thrusting actuators are protruded towards the upper surface side of the main body unit 4. Within the main body unit 4 are arranged switch elements thrust by the first to fourth thrusting actuators 11a to 11d. These switch elements are turned on and off by thrusting actuation of the thrusting actuators 11a to 11d to input command signals for setting the operational functions or executing the operation of the display character.

On the end faces of the first to fourth thrusting actuators 11a to 11d are inscribed symbols indicating the functions of the thrusting actuators 11a to 11d, such as □, X, ○ or Δ. In the present embodiment, the symbols Δ, □, X and ○ are affixed to the first, second, third and fourth thrusting actuators 11a to 11d, respectively. Specifically, the third and fourth thrusting actuators 11c, 11d, that are positioned towards the second grip 6 and hence can be acted on easily by the thumb finger when the second grip 6 is held by hand, are set to enter command signals "YES" and "NO" frequently used in prosecuting the game. Thus, marks "○" and "X" corresponding to the commands of "YES" and "NO" are inscribed on these third and fourth thrusting actuators 11c and 11d. That is, even if the actuating device 1 is provided with a large number of actuators, the third and fourth thrusting actuators 1c, 11d, used frequently, are located at easy-to-operate positions, thus improving operability of the minimum number of the thrusting actuators required in prosecution of the game.

The first to fourth thrusting actuators 11a to 11d may also be designed to indicate the various functions by different colors. That is, the functions of the thrusting actuators 11a to 11d may be indicated by respective different colors.

Similarly to the first to fourth thrusting actuators 8a to 8d making up the first actuating unit 9, the first to fourth thrusting actuators 11a to 11d may be integrally provided on the upper sides thereof contacted by the hand or finger with a top layer formed of an elastomer exhibiting rubber-like elasticity. This top layer is effective to improve contact feeling of hand or finger with the first to fourth thrusting actuators 11a to 11d and hence the operability of the device.

The third and fourth actuating units 14, 15 are hereinafter explained. These third and fourth actuating units 14, 15 are mounted on substantially cylindrically-shaped mounting portions 47,48 at corner portions of the connecting sides of the first and second grips 5, 6 to the main body unit 4 for facing each other, as shown in FIG. 1.

Since the third and fourth actuating units 14, 15 are of the same structure, only the third actuating unit 14 is hereinafter explained.

Figure 14:
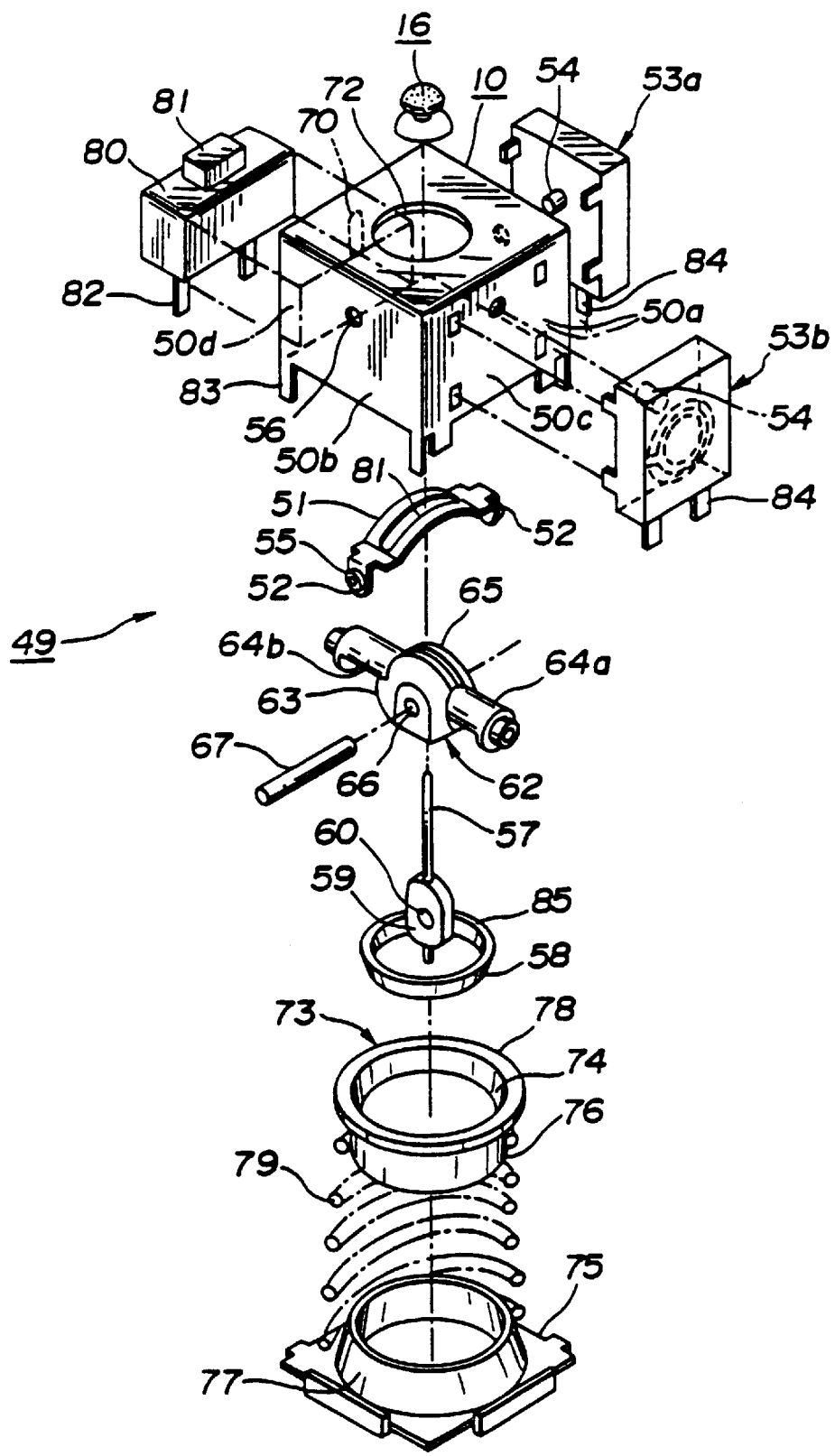
FIG. 14 is an exploded perspective view showing a multi-directional input device constituting third and fourth actuating units.

The third actuating unit 14 has a multi-directional input device, as shown in FIG. 14. This multi-directional input device has a box-shaped upper frame 50 and an arched first interlock type member 51, as shown in FIG. 14. The first interlock type member 51 is rotatably carried by the upper frame 50 by having a warped end portion 52 engaged with a rotary shaft 54 of a first variable resistor 53a operating as a rotary detector secured to a lateral side 50a of the upper frame 50 and by having a lug 55 of the opposite side warped end portion 52 loosely fitted in an opening 56 formed in a lateral side 50b opposite to the lateral side 50a of the frame 50.

At a center position of the upper frame 50 is arranged an actuating shaft 57 having a saucer-like operating portion 58 on its lower end and a disc 59 at a mid portion. This disc 59 has an orifice 60. The upper portion of the actuating shaft 57 is connected to the rotation actuator 16.

Within the upper frame 50 is arranged a second interlock type member 62 for extending at right angles to the actuating shaft 57. The second interlock type member 62 has a ball 63 at its center and a pair of arms 64a, 64b extending horizontally with respect to the ball 63. The ball 63 has a groove extending from its upper side to its lower side. After the actuating shaft 57 and the disc 59 are inserted into the groove 65, and the orifice 60 is brought into registration with the hole 66 in the lateral side of the ball 63, the pin 67 is inserted into the hole 66 and the orifice 60 and the actuating shaft 57 is mounted on the second interlock type member 62 for rotation along the groove 65 with the pin 67 as a supporting shaft.

The second interlock type member 62 is projects outwards from the lateral side 50c of the upper frame 50. A rotary shaft 54 of a second variable resistor 53b secured to the lateral side 50c of the upper frame 50 engages with the end of the arm 64a and the end of the opposite side arm 64b fits in an elongated hole 70 formed in the lateral side 50d of the upper frame 50. The actuating shaft 57 is passed through the groove 81 of the first interlock type member 51 and subsequently projected outwards via an opening 72 formed in the upper surface of the upper frame 50.

The actuating shaft 57 is supported on a restoration member 73 which has a saucer-like operating member 58 rotatably housed in its upper surface side recess 74.

A lower frame 75 is mounted on the lower end of the upper frame 50. On the upper surface of the lower frame 75 is formed a supporting wall section 77 for vertically movably housing a flange 76 of the restoration member 73. Between the bottom surface of the lower frame 75 and the outer peripheral rim 78 of the restoration member 73 is housed a restoration spring 79 biasing the restoration member 73 upwards. The end of the arm 64b of the second interlock type member 62 is caused to compress against the upper edge of the elongated hole 70 in the lateral side 50d of the upper frame 50. The second interlock type member 62 is rotatably mounted on the upper frame 50 in a direction perpendicular to the first interlock type member 51 below the first interlock type member 51.

On the lateral side 50d of the upper frame 50 is mounted a thrust type switch element 80 which is changed over by thrusting the spring-biased thrusting actuator 81 against spring bias. The thrusting actuator 81 faces the end 82 of the arm 64b of the second interlock type member 62. This end 82 is projected in the same direction as a mounting leg 83 provided on the lower edge of the upper frame 50 and terminals 84 of the first and second variable resistors 53a, 53b.

The operating state of the multi-directional input device 50 is hereinafter explained.

If the user holds the rotation actuator 16 and rotates the actuating shaft 57 in an optional direction, the actuating shaft 57 is rotated about the point of intersection of the second interlock type member 62 with the pin 67 as the center of rotation. With rotation of the actuating shaft 57, the first interlock type member 51 and the second interlock type member 62 run in rotation. The rotary shafts of the first and second variable resistors 53a, 53b are also run in rotation to adjust resistance values.

The operation for automatic restoration of the actuating shaft 57 is hereinafter explained.

During the neutral state in which the actuating shaft 57 is not actuated, the actuating shaft 57 is set upright from the opening 72 in the upper surface of the upper frame 50, with the bottom surface of the operating member 58 compressing against the inner bottom surface of the restoration member 73 by the restoration spring 79.

Figure 15:
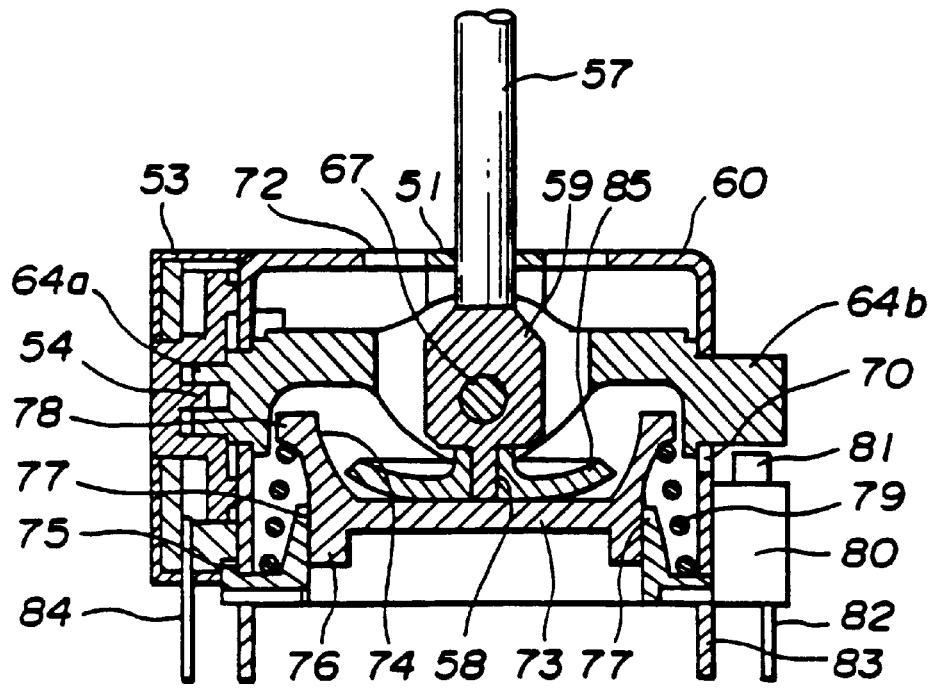
FIG. 15 is a cross-sectional view showing the multi-directional input device in an initial state of the actuating shaft.
Figure 16:
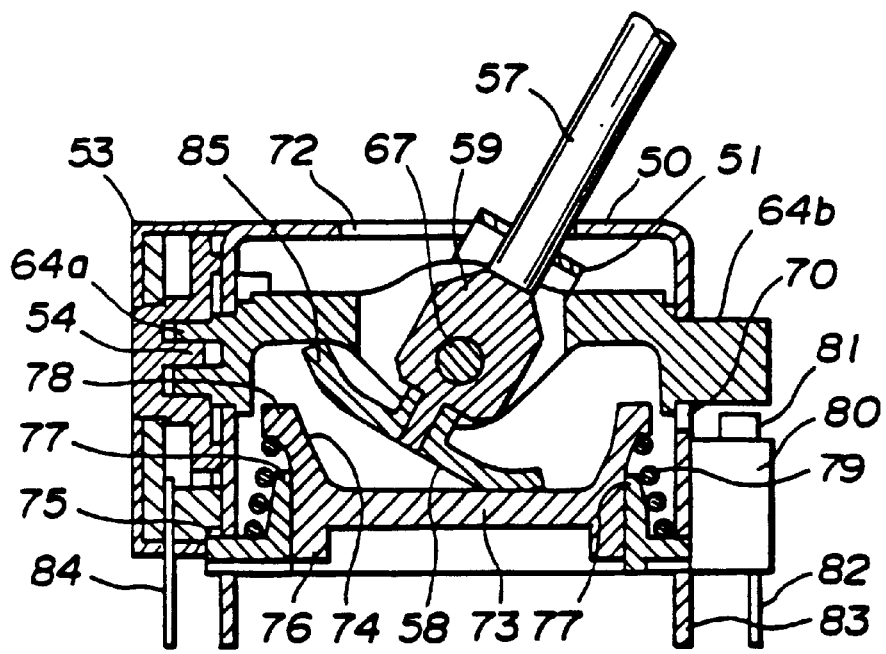
FIG. 16 is a cross-sectional view showing the multi-directional input device on rotational actuation of the actuating shaft.

If the actuating shaft 57 is tilted clockwise from this state as shown in FIG. 16, the flange 85 having an arcuate portion the radius of curvature of which is progressively increased towards outside of the operating member 58 thrusts the restoration member 73 downwards along the supporting wall section 77 of the lower frame 75 against the elasticity of the restoration spring 79. If the operating pressure on the actuating shaft 57 is relinquished, the neutral state shown in FIG. 15 is restored, that is the actuating shaft 57 is restored to its upstanding state, under the bias of the restoration spring 79.

The operation of the switch element 80 is explained with reference to FIGS. 17 and 18.

Figure 17:
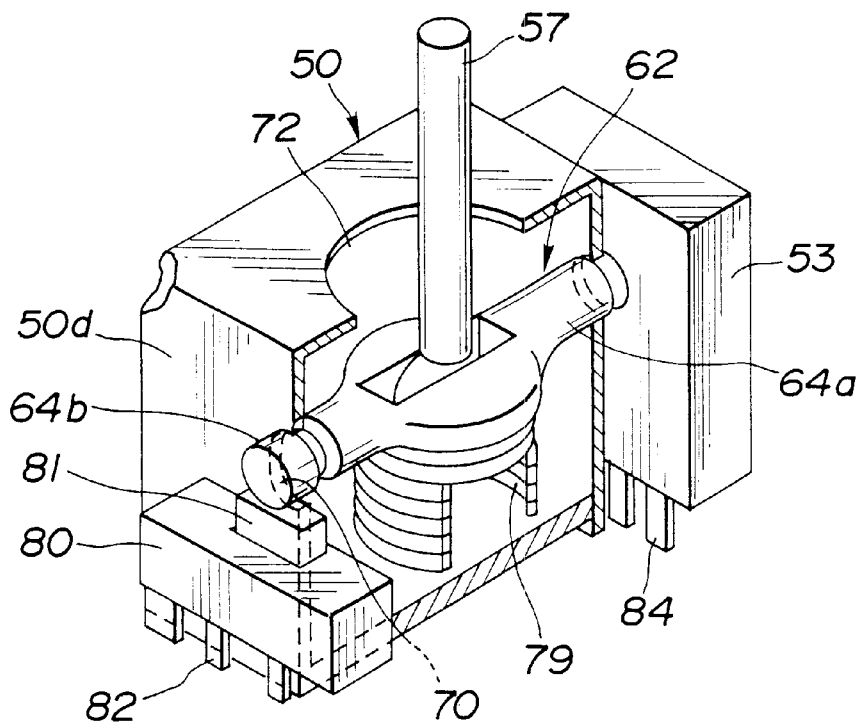
FIG. 17 is a perspective view of the multi-directional input device for illustrating the state of actuating a thrusting actuating type switch element, with a portion thereof being broken away.
Figure 18:
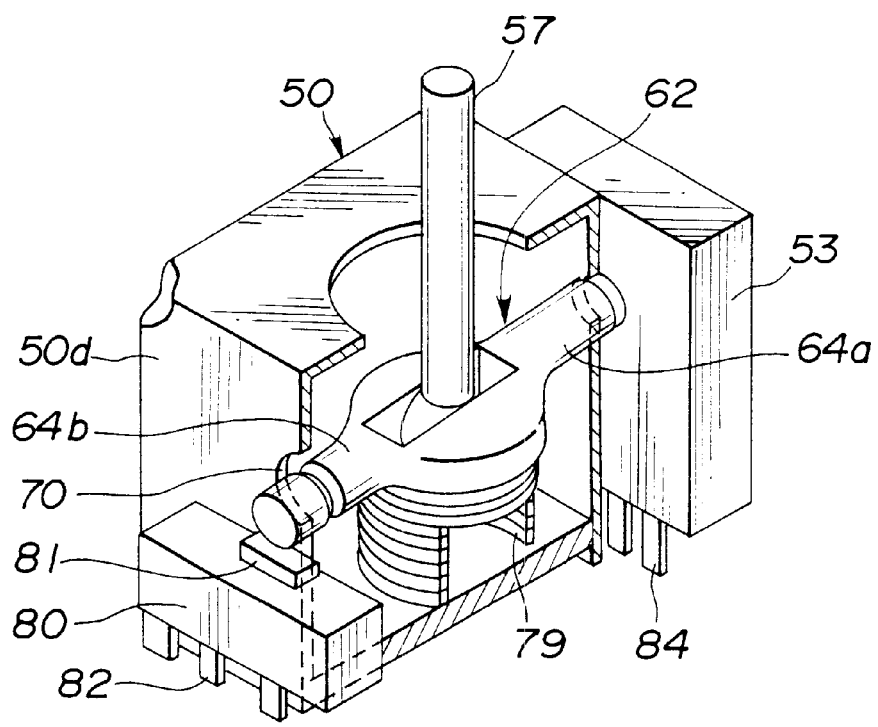
FIG. 18 is a perspective view of the multi-directional input device for illustrating the actuated state of the thrusting actuating type switch element, with a portion thereof being broken away.

The actuating shaft 57 in the non-operative state is at a position shown in FIG. 17, in which the end of the arm 64b of the second interlock type member 62 is spaced apart from the thrusting actuator 81 of the switch element 80 and the end of the arm 64b compresses against the upper edge of the elongated opening 70 of the lateral surface 50d of the upper frame 50. If the actuating shaft 57 is thrust downwards from this state, the end of the arm 64b of the second interlock type member 62 is moved downwards, along the elongated hole 70, against the bias of the restoration spring 79, with the engagement point of the arm 64a with the rotary shaft 54 of the first variable resistor 53b as a fulcrum point, until the end of the arm 64b is retained by the lower edge of the elongated opening 70 operating as a stop. At this time, the end of the arm 64b thrusts the thrusting actuator 81 of the switch element 80 downwards to change over the state of the switch element 80. If the actuating shaft 57 ceases to be thrust, the end of the arm 64b is restored to the state shown in FIG. 17, against the recoiling force of the restoration spring 79, with the end of the arm 64b being reset to the state of FIG. 17 in which the end of the arm compresses against the upper edge of the elongated opening 70. The switch element 80 is in operation even if the thrusting actuator 81 is thrust when the actuating shaft 57 has been rotated in an optional direction.

By rotation of the rotation actuators 16 and consequent actuation of the first and second variable resistors 53a, 53b, the third and fourth actuating units 14, 15 can issue the command information of continuously moving the display character, rotating and simultaneously advancing the display character or changing its line of sight.

Figure 19:
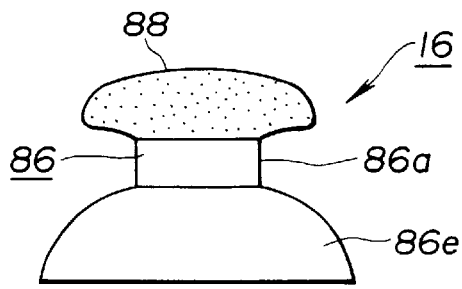
FIG. 19 is a side view showing a rotary actuating member used in the first and second actuating units.
Figure 20:
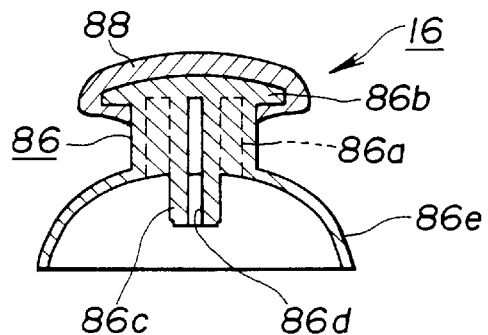
FIG. 20 is a longitudinal cross-sectional view of the rotary actuating member.

It is noted that the rotation actuators 16 for actuating the third and fourth actuating units 14, 15 are provided with a main actuator body portion 86 mounted on the distal end of the actuating shaft 57, as shown in FIGS. 19 and 20. The main actuator body portion 86 is molded integrally from a synthetic resin material of higher toughness to inhibit deformation. The main actuator body portion 86 has a shank portion 86a on the distal end of which an ellipsoidally-shaped head 86b is protuberantly formed and on the proximal end of which a tubular fitting projection 86c is formed so as to serve for mounting the actuating shaft 57. There is bored a fitting hole 86d extending from the fitting projection 86c to the mid portion of the shank portion 86a and in which is fitted the actuating shaft 57. On the outer rim of the proximal end of the shank portion 86a is protuberantly formed a semi-spherically-shaped flange 86e. When the rotation actuators 16 are fitted on the actuating shaft 57, the flange 86e fits in an opening 87 formed in the main body unit 4 to permit rotation of the rotation actuators 16 in order to cover the opening 87 and in order to guide the rotation of the rotation actuators 16, as shown in FIGS. 1 and 2.

On the upper surface side of the head 86b, contacted by the hand or finger, there is integrally formed a top layer 88 formed of a flexible material, as shown in FIGS. 19 and 20. The material of the top layer 88 may be an elastomer exhibiting rubber-like elasticity. The top layer 88 is formed by two-color molding on the head 86b of the main actuator body portion 86. The upper surface side of the top layer 88 is arcuately formed towards above for improving the tactile feeling.

With the rotation actuators 16, having the top layer 88 of a flexible material on its portion touched by hand or finger, it is possible to reduce the impact otherwise applied to the hand or finger when the actuators are thrust, thus improving the operating feeling on acting on the actuators 16. The elastomer of the top layer 88 operates as anti-slip in case of actuation of the rotation actuators 16.

Since the top layer 88 is integrally formed with the main actuator body portion 86 by two-color molding, the top layer can be positively affixed to the main actuator body portion 86 to prevent separation on repeated thrusting operations.

Although the top layer 88 of a flexible material is formed for covering the outer periphery of the head 86*b* from the upper side, as shown in FIG. 20, the head 86*b* may also be formed of an elastomer similar to that of the top layer 88.

The fifth and sixth actuating units 17, 18, provided on the front side of the main body unit 4, are hereinafter explained.

As for the fifth and sixth actuating units 17, 18, the first and second thrusting actuators 19*a*, 19*b* and 20*a*, 20*b* are arranged so that the distal ends of the fifth and sixth actuating units 17, 18 are protruded from the front side of the main body unit 4 via paired upper and lower parallel openings 91 formed in the front sides of the main body unit 4. Within the main body unit 4 are provided switch elements in association with the thrusting actuators 19*a*, 19*b* and 20*a*, 20*b*. For improving the operating feeling, the portions of the thrusting actuators 19*a*, 19*b* and 20*a* contacted by the hand or finger may similarly be provided with a top layer formed of elastomer.

Figure 21:
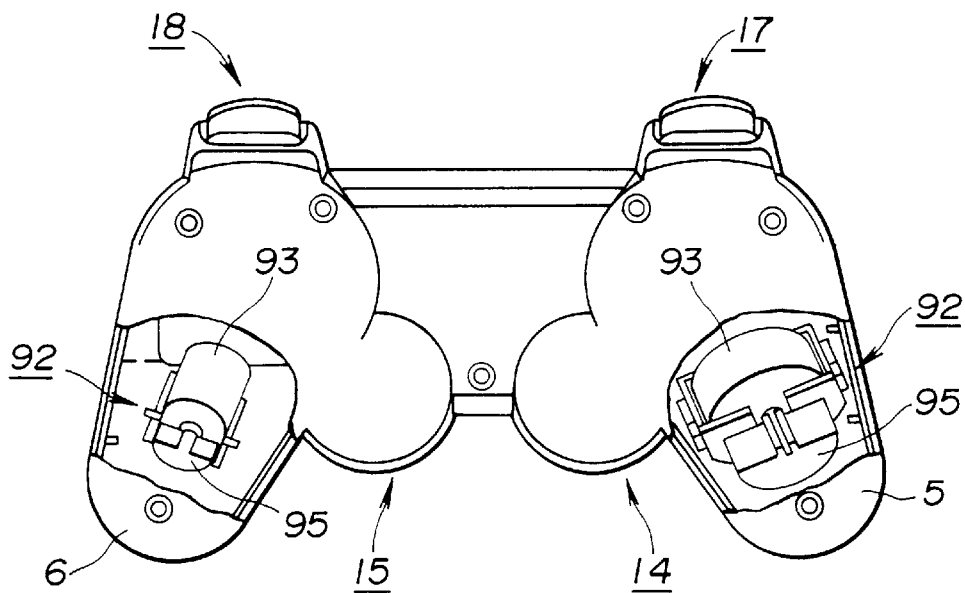
FIG. 21 is a bottom view for illustrating the state in which a vibration imparting mechanism is provided in first and second grips.
Figure 22:
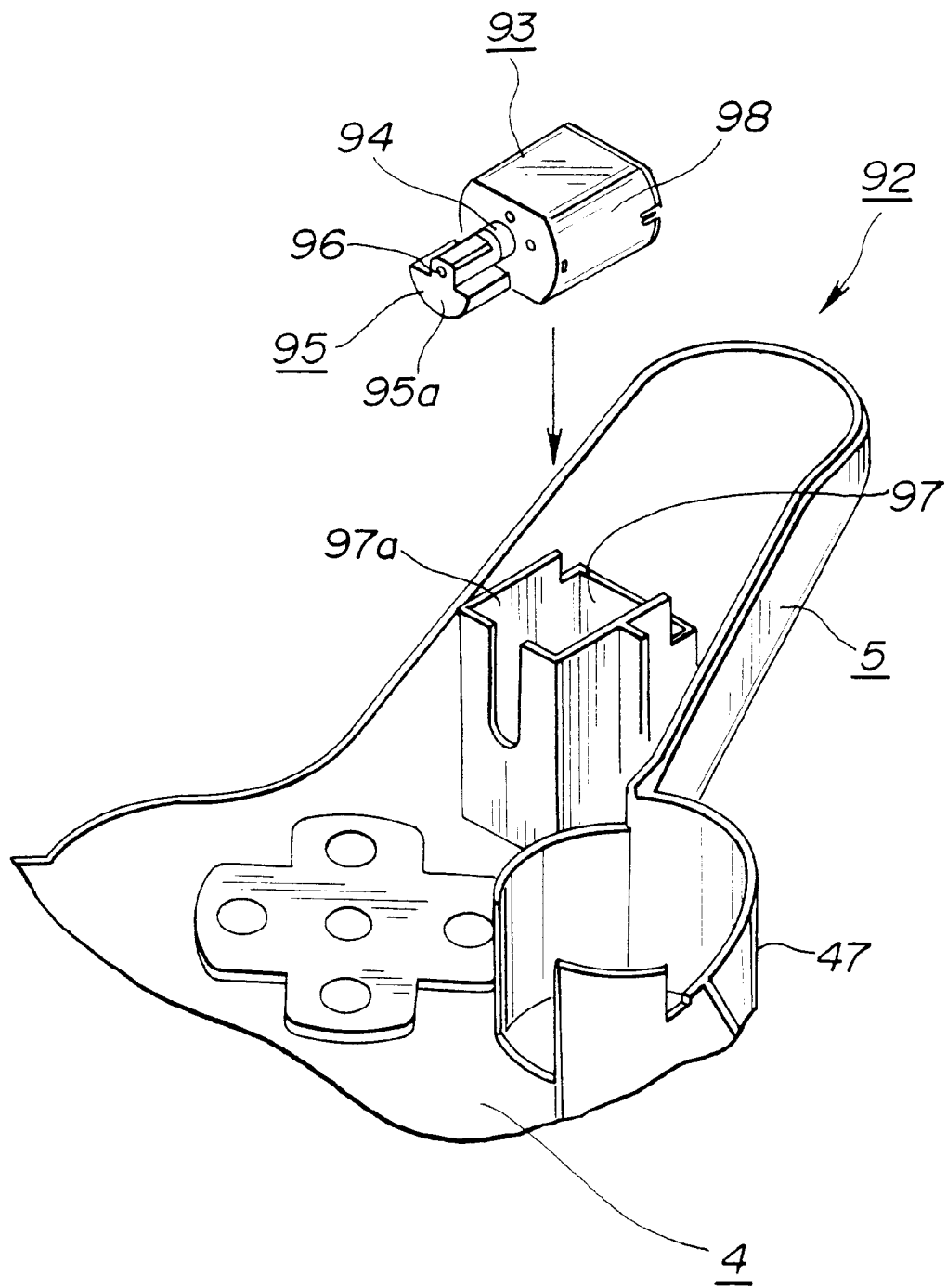
FIG. 22 is an exploded perspective view showing the vibration imparting mechanism.
Figure 23:
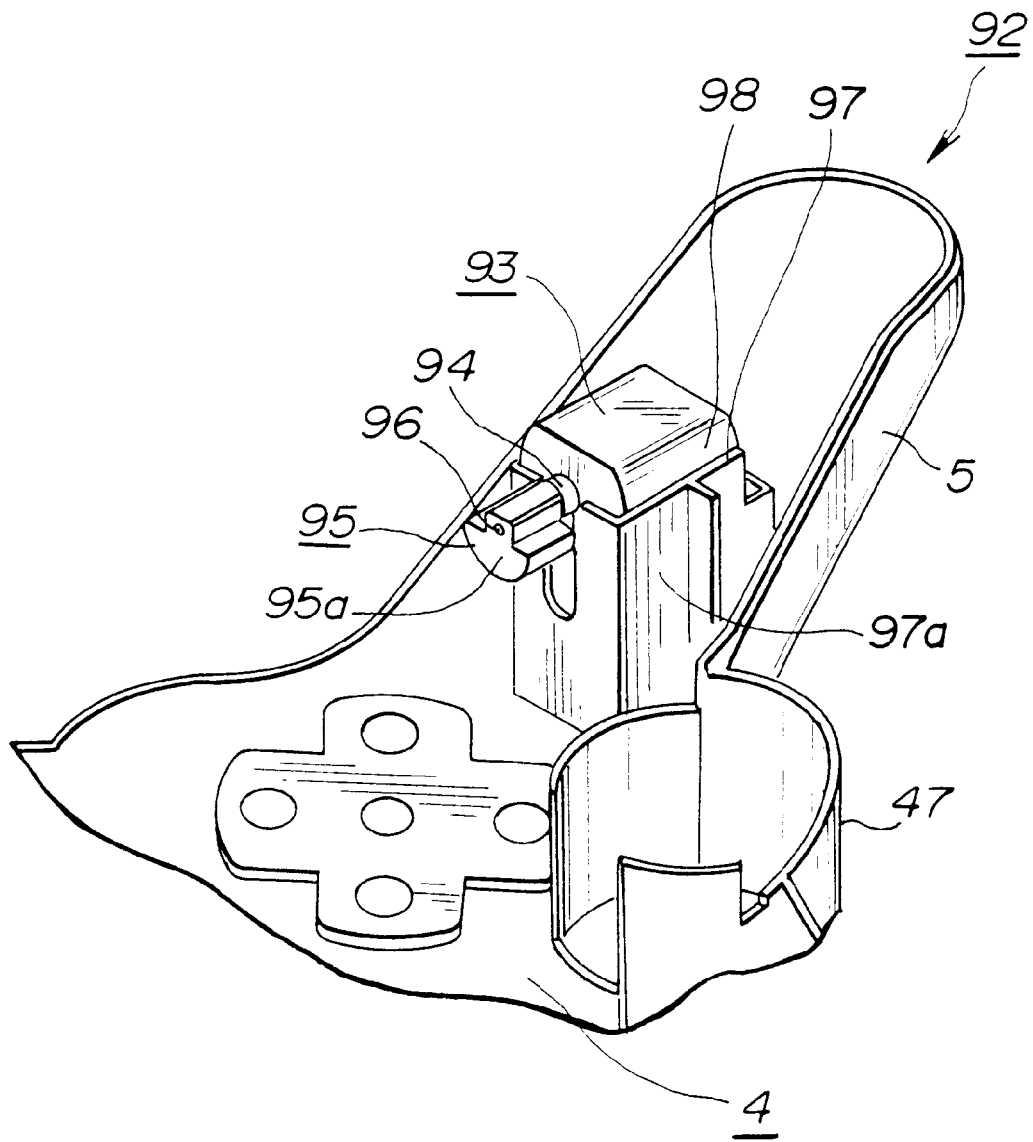
FIG. 23 is a perspective view showing the state in which the vibration imparting mechanism has been assembled in a main body unit of the device.

The actuating device 1 of the present invention is provided with vibration-imparting units 92, 92 for imparting vibration to the user to realize more vivid play feeling. These vibration-imparting units 92, 92 are provided on the proximal ends of the first and second grips 5, 6 held by the hand or finger of the user gripping the actuating device 1, as shown in FIG. 21. These vibration-imparting units 92, 92 are made up of a driving motor 93 driven by driving command signals sent from the main body unit of the game machine and an eccentric member 95 mounted on a driving shaft 94 of the driving motor 93. The eccentric member 95 is constituted by a metal member of a large weight mass and a semi-circular weight 95*a* offset relative to the fitting hole 96 engaged by the driving shaft 94. The driving motor 93 having the eccentric member 95 mounted on the driving shaft 94 is mounted by having a motor housing 98 fitted in a tubular fitting recess 97 of a rectangular cross-section formed on the inner side of the first grip 5, as shown in FIG. 23.

In the above-described vibration-imparting units 92, 92, the driving motor 93 is actuated to run the eccentric member 95 in rotation so that the driving motor 93 is vibrated. The vibrations of the driving motor 93 are transmitted via a peripheral wall section 97*a* of the fitting recess 97 to the first grip 5 to transmit the vibrations to the hand or finger holding the grip 5.

It is noted that the driving motors 93 of the vibration-imparting units 92, 92 differ in power rating so that, when the vibration-imparting units 92, 92 are driven by a constant driving voltage, the driving motors differ in rotational speeds such that the eccentric members 95 are rotated at differential speeds to produce vibrations of different frequencies.

Figure 24:
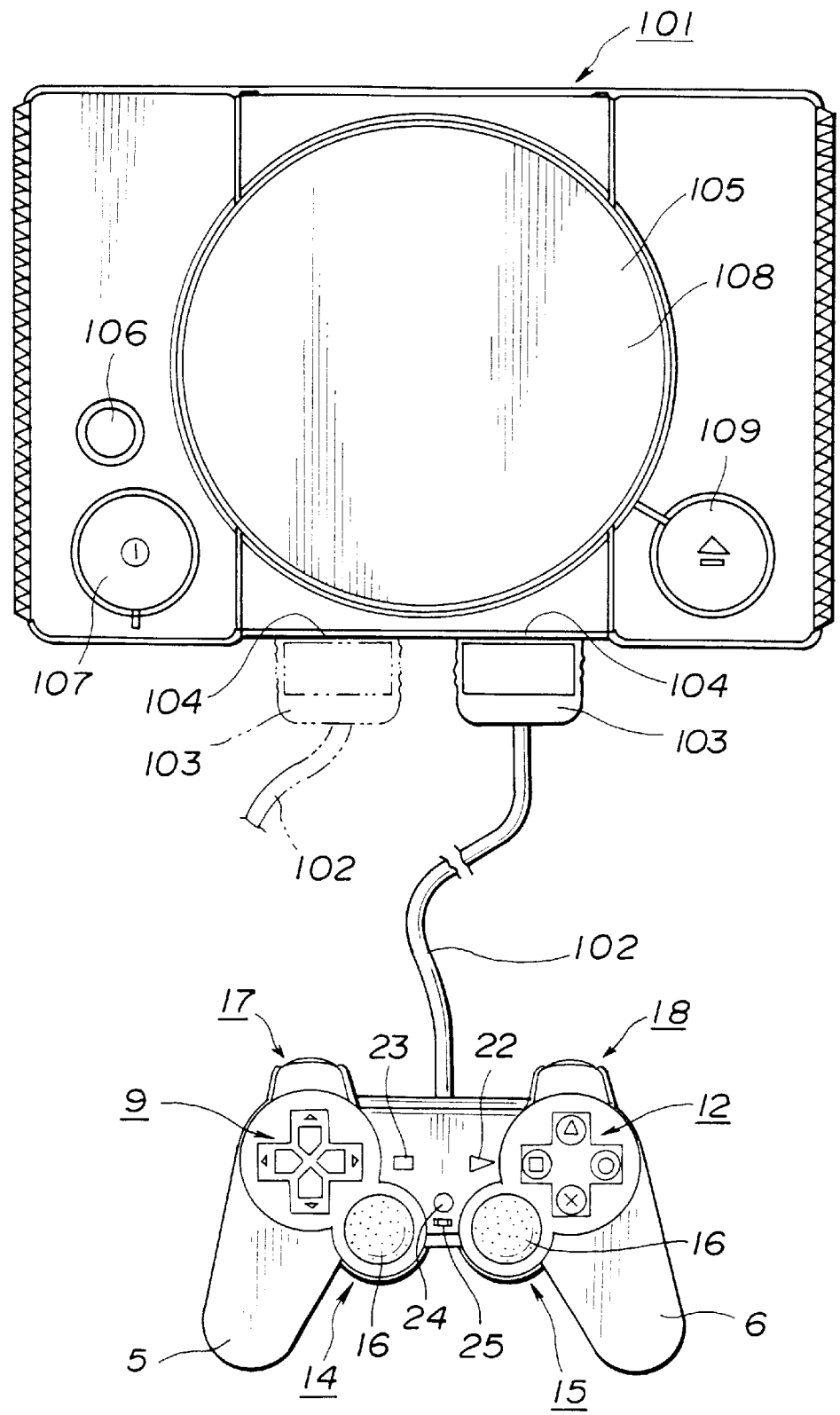
FIG. 24 is a plan view showing the state in which the actuating device for the game machine has been connected to a main body unit of the game machine.

The actuating device 1 of the game machine according to the present invention is connected to the main body unit 4 of the game machine as shown in FIG. 24.

The actuating device 1 is connected to the main body unit of the game machine 101 via a connection cord 102 pulled out from a mid portion on the front side of the main body unit 4. The connection cord 102 has an end connector 103 which is connected to a jack 104 provided on a lateral surface of the main body unit 101 to connect the actuating device 1 to the main body unit of the game machine 101.

It is noted that the main body unit of the game machine 101 has plural jacks 104 to enable connection thereof to plural actuating devices 1.

The main body unit of the game machine 101 has, enclosed therein, a disc driving unit 105 for reproducing an optical disc having a game program recorded thereon, and a picture processing device for displaying the display character, along with the background picture, on the screen of the television receiver in accordance with the game program recorded on the optical disc. The main body unit of the game machine 101 also has a reset switch 106 for resetting the game being executed, a power switch 107 and a lid opening button 109 for opening a lid 108 adapted for opening/closing the disc loading unit of the disc driving unit 105.

The main body unit of the game machine 101 is connected to a television receiver as a display device for displaying the display character along with the background picture.

In the above-described actuating device 1 for the game machine according to the present invention, the first to sixth actuating units 9, 12, 14, 15, 17 and 18 can be actuated using up to a maximum of 10 fingers, as the first and second grips 5, 6 are held with both hands. The actuating device 1 can also be actuated using only one of the first and second grips 5, 6.

That is, by suitably actuating the first to sixth actuating units 9, 12, 14, 15, 17, and 18, it is possible to perform operations not only of translating the display character, but of rotating the display character or moving it with an accelerated motion in order to cope with the game of a three-dimensional spatial picture. Moreover, since vibrations can be imparted to the user, the game can be executed with a vivid play feeling.

Therefore, using the actuating device 1 for the game machine according to the present invention the display character can perform complex movements to execute a game program with a vivid play feeling. It is possible, for example, to realize a game in which an aircraft or a submarine performs a complex movement through a three-dimensional space for play performance along three axes of movements.

What is claimed is:

1. An actuating device for a game machine, comprising:

a main body unit having first and second sides and an upper surface;

first and second grips protruding at spaced positions from the first side of the main body unit;

a first actuating unit mounted in the main body unit adjacent one of the spaced positions, the first actuating unit having a plurality of first thrusting actuators protruding from the upper surface of the main body unit and a plurality of signal input elements each for generating a signal when a corresponding one of the first thrusting actuators is depressed;

a second actuating unit mounted in the main body unit adjacent the other one of the spaced positions, the second actuating unit having a plurality of second thrusting actuators protruding from the upper surface of the main body unit and a plurality of signal input elements each for generating a signal when a corresponding one of the second thrusting actuators is depressed; and third and fourth actuating units mounted to the main body unit adjacent the spaced positions and in confronting relationship to one another, the third and fourth actuating units each having a rotation actuator and at least one signal input element for generating a signal in response to an operation of the corresponding rotation actuator;

the rotation actuators each having a main actuator body made of a synthetic resin and a top portion formed on the main actuator body and made of a flexible material which is softer than the synthetic resin.

2. The actuating device according to claim 1, wherein each of the thrusting actuators has a top portion made of the flexible material.

3. The actuating device according to claim 1, wherein the top portion of the rotation actuator is made of an elastomer.

4. The actuating device according to claim 1, wherein the top portion of the rotation actuator is integrally formed with the main actuator body.

5. The actuating device according to claim 4, wherein the main actuator body and the top portion are formed by two-color molding.

6. The actuating device according to claim 1, wherein the top portion of the rotation actuator has an outwardly bulging external surface.

7. The actuating device according to claim 1, further comprising vibration-imparting units housed in the first and second grips.

8. The actuating device according to claim 7, wherein the vibration-imparting units produce vibration states which are different from one another.

9. The actuating device according to claim 7, wherein the vibration-imparting units produce vibration frequencies which are different from one another.

10. The actuating device according to claim 7, wherein each of the vibration imparting units includes a driving motor and an eccentric member mounted on a driving shaft of the driving motor.

11. The actuating device according to claim 10, wherein the vibration-imparting units are of different vibration-imparting configurations.

12. An actuating device for a game machine, comprising:

a main body having first and second sides and an upper surface;

first and second grips protruding from the first side of the main body at both ends thereof;

vibration-imparting units housed in the first and second grips; and an actuating unit provided in the main body and having an actuator protruding from the upper surface of the main body and a signal input element for generating a signal in response to an operation of the actuator, wherein the actuator has a main actuator body made of a synthetic resin and a top portion formed on the main actuator body and made of a flexible material which is softer than the synthetic resin.

13. The actuating device according to claim 12, wherein each of the vibration-imparting units includes a driving motor and an eccentric member mounted on a driving shaft of the driving motor.

14. The actuating device according to claim 12, wherein the vibration-imparting units produce vibration states which are different from one another.

15. The actuating device according to claim 14, wherein the vibration-imparting units produce vibration frequencies which are different from one another.

* * * * *

UNITED STATES PATENT AND TRADEMARK OFFICE
CERTIFICATE OF CORRECTION

PATENT NO. : 6,394,906 B1
DATED : May 28, 2002
INVENTOR(S) : Hiroki Ogata

It is certified that error appears in the above-identified patent and that said Letters Patent is hereby corrected as shown below:

Column 3,
Line 38, after "thereof" insert -- . --.
Line 40, delete "a", first occurrence.

Column 4,
Line 64, delete "," after "9".

Column 5,
Line 3, delete "thrustingly".
Line 33, after "16" insert -- , --.

Column 7,
Line 51, delete "in".
Line 65, delete "are".

Column 8,
Line 26, delete "," after "10".
Line 27, delete ", are formed".

Column 11,
Line 1, delete "is".
Line 5, after "64*a*" insert -- , --.

Column 13,
Line 23, after "20a" insert -- ,20b --.

Signed and Sealed this

Twenty-second Day of October, 2002

Attest:

Attesting Officer

JAMES E. ROGAN
*Director of the United States Patent and Trademark Office*